Aug. 18, 1964   E. A. GYORI ETAL   3,145,043
TRAILER FOR HAULING VEHICLES

Filed June 12, 1961   6 Sheets-Sheet 1

INVENTORS
EMERY A. GYORI
LESTER J. HAMMONS
BY M. A. Hobbs
ATTORNEY

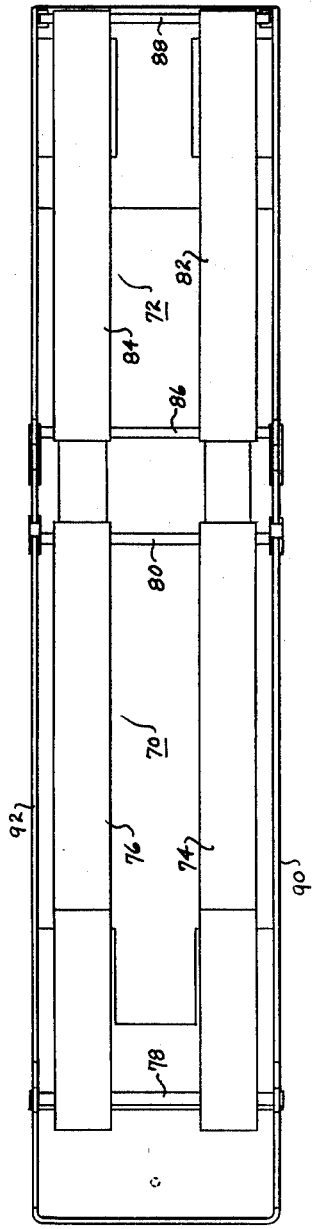

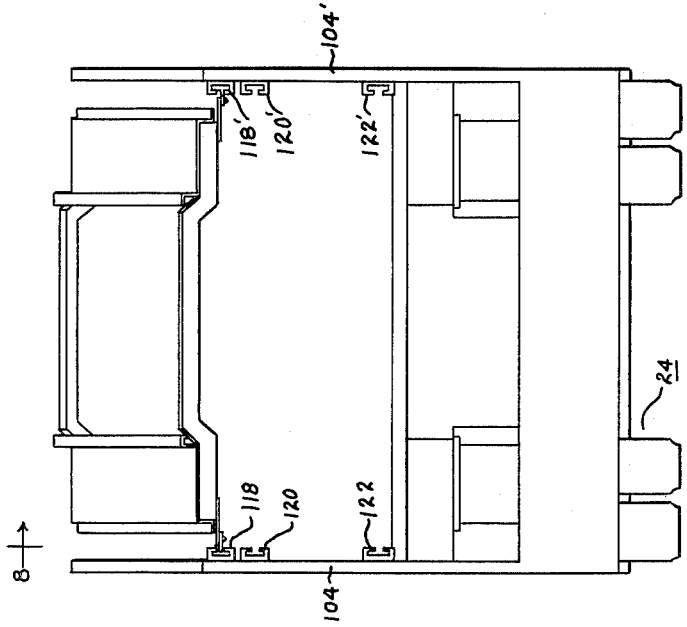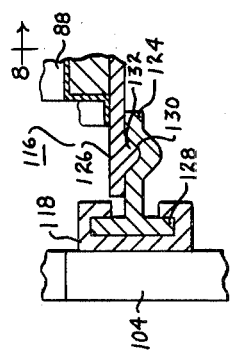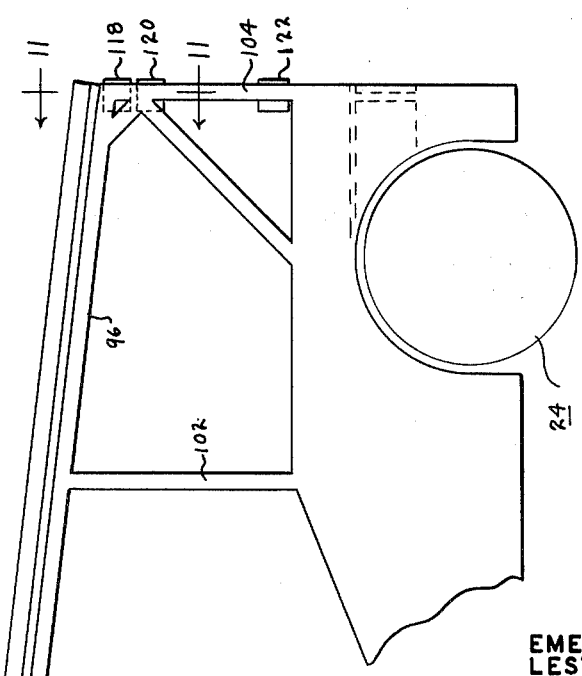

Aug. 18, 1964        E. A. GYORI ETAL        3,145,043
TRAILER FOR HAULING VEHICLES
Filed June 12, 1961        6 Sheets-Sheet 4

INVENTORS
EMERY A. GYORI
LESTER J. HAMMONS
BY *M. A. Hobbs*
ATTORNEY

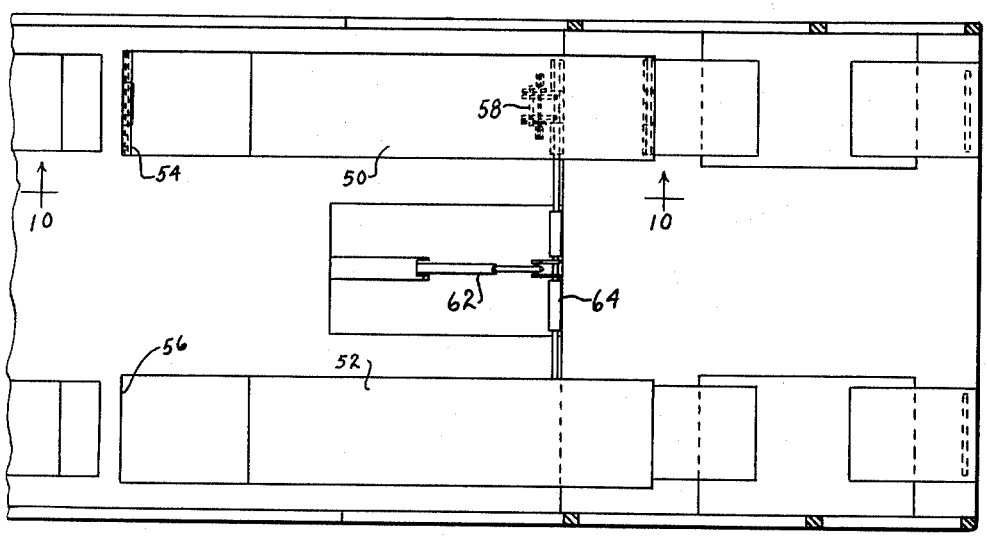
FIG. 9
FIG. 8
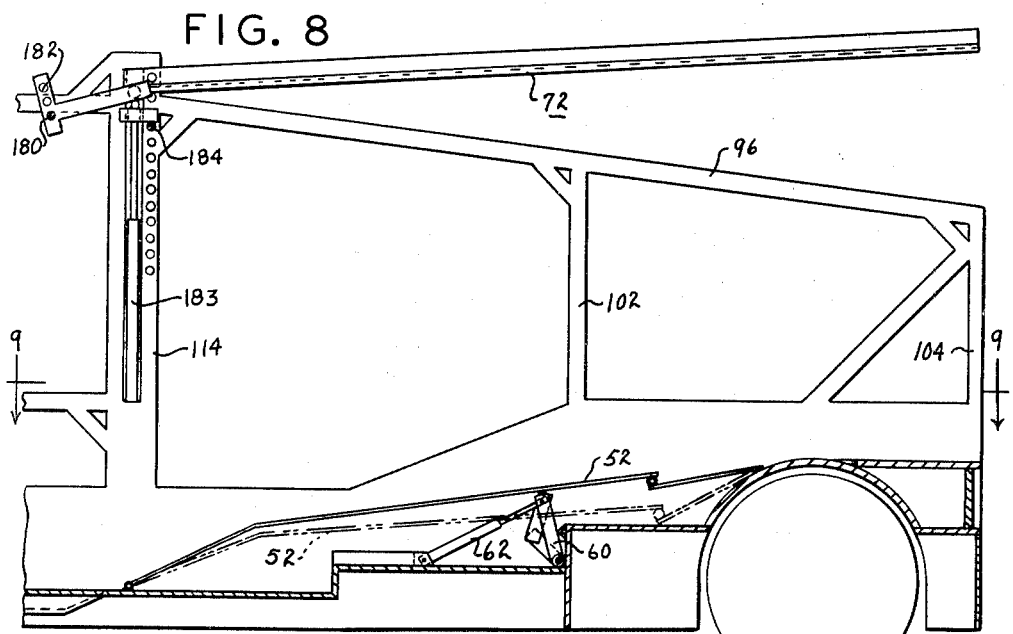
FIG. 10
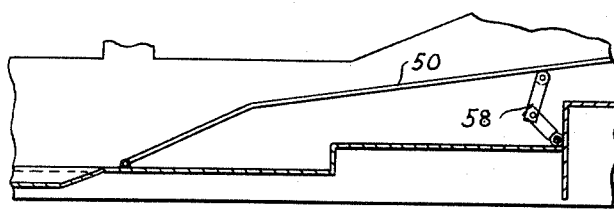
INVENTORS
EMERY A. GYORI
LESTER J. HAMMONS
BY M. A. Hobbs
ATTORNEY

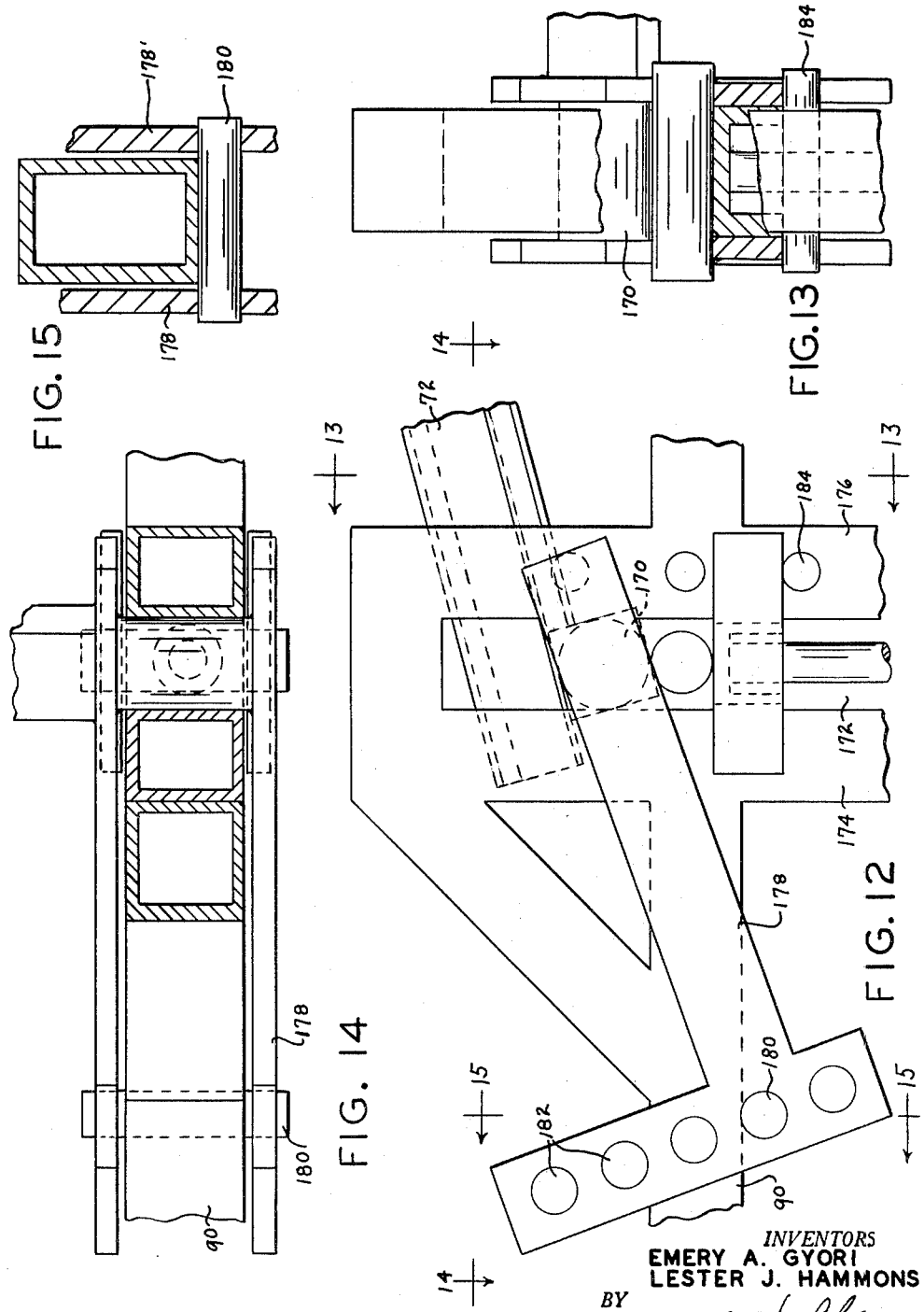

United States Patent Office 3,145,043
Patented Aug. 18, 1964

3,145,043
TRAILER FOR HAULING VEHICLES
Emery A. Gyori and Lester J. Hammons, both of
4000 W. Sample St., South Bend, Ind.
Filed June 12, 1961, Ser. No. 116,439
5 Claims. (Cl. 296—1)

The present invention relates to trailers and more particularly to trailers for hauling various sizes of automobiles, trucks and similar vehicles.

In recent years the competition in the transportation of automobiles, trucks and similar vehicles has increased to the extent that only fully and compactly loaded trailers can remain competitive, particularly with railroads. The conventional automobile transporting trailer is designed for hauling a definite number of automobiles and/or trucks regardless of the size or shape of these vehicles. Consequently a fully loaded trailer may contain a substantial amount of unused space and load capacity, particularly in the transportation of compact automobiles and trucks without beds and/or bodies. Since trailers in most instances are used to haul automobiles and trucks in various sizes and in various conditions, the operation frequently becomes inefficient and expensive. It is therefore one of the principal objects of the present invention to provide a vehicle hauling trailer which has upper and lower tier construction with the upper structure being adjustable vertically in order to facilitate loading of the lower tier and utilizing the space on the trailer to the fullest advantage, and which results in a lower center of gravity in the fully loaded trailer.

Another object of the present invention is to provide a trailer for hauling automobiles of various types and sizes, and trucks with or without their beds or bodies, which can be so adjusted and arranged during the loading operation to adapt the trailer to the particular type of vehicle being carried and most satisfactorily to the number of vehicles for a given load.

Another object of the invention is to provide a trailer for hauling automobiles, trucks and similar vehicles, in which the vehicles are placed in two principal tiers with the upper tier being adjustable vertically and angularly to provide the most compact arrangement and lowest height possible, without contacting or crowding the other vehicles on the trailer.

A further object is to provide a vehicle of the aforesaid type in which the structure supporting the upper tier of vehicles can be elevated to the extent required to freely and conveniently load the lower tier, and thereafter can be lowered and adjusted to within a short distance above the lower tier, and in which the upper tier is articulated, with the various sections thereof movable to various off-horizontal positions in order to place the heavier portions of the vehicle in the lowest possible position, and thereby lower the center of gravity as well as the height of the entire loaded trailer.

Still another object of the present invention is to provide a versatile universal vehicle-carrying trailer which can be adjusted by relatively simple mechanisms to carry most efficiently any particular size or shape of automobile, truck or bus, and which is adapted to be used or towed by conventional tractors in the same manner and under the same conditions as the conventional vehicle-carrying trailer.

Additional objects and advantages of the present invention will become apparent from the following description and the accompanying drawings, wherein:

FIGURE 3 is a top plan view of the trailer shown in the preceding figures with the vehicles removed therefrom;

FIGURE 4 is a rear elevational view of the trailer shown in the preceding figures;

FIGURE 5 is a fragmentary side elevational view of the trailer shown in the preceding figures with the vehicles removed therefrom;

FIGURE 8 is a fragmentary vertical cross sectional view of the trailer, taken on line 8—8 of FIGURE 4;

FIGURE 9 is a fragmentary horizontal cross sectional view of the same portion of the trailer as that shown in FIGURE 8, taken on line 9—9 of the latter figure;

FIGURE 10 is a fragmentary vertical cross sectional view of the trailer, taken on line 10—10 of FIGURE 9;

FIGURE 11 is a fragmentary vertical cross sectional view of the trailer, taken on line 11—11 of FIGURE 5;

FIGURE 12 is a fragmentary side elevational view of a portion of the adjustment mechanism for the structure supporting the upper tier of vehicles;

FIGURE 13 is a partial cross sectional view of the mechanism shown in FIGURE 12, taken on line 13—13 of the latter figure;

FIGURE 14 is a partial horizontal cross sectional view of the mechanism shown in FIGURE 12, taken on line 14—14 of the latter figure; and FIGURE 15 is a vertical cross sectional view of the mechanism shown in FIGURE 12, taken on line 15—15 of the latter figure.

Figure 1:
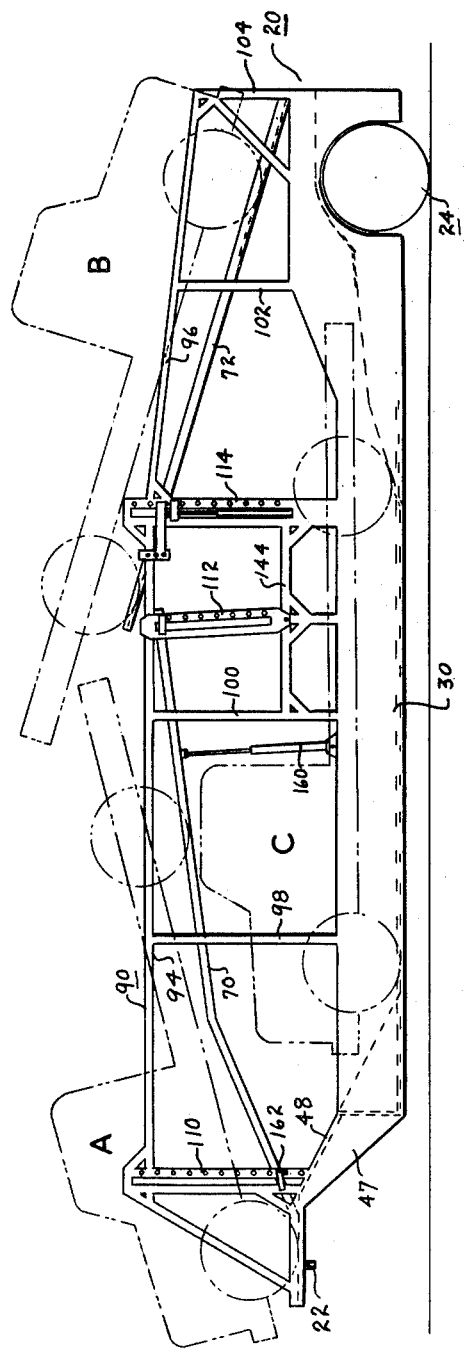
FIGURE 1 is a side elevational view of the present trailer showing it disconnected from the tractor and supporting a number of trucks in position for being transported by the trailer.
Figure 2:
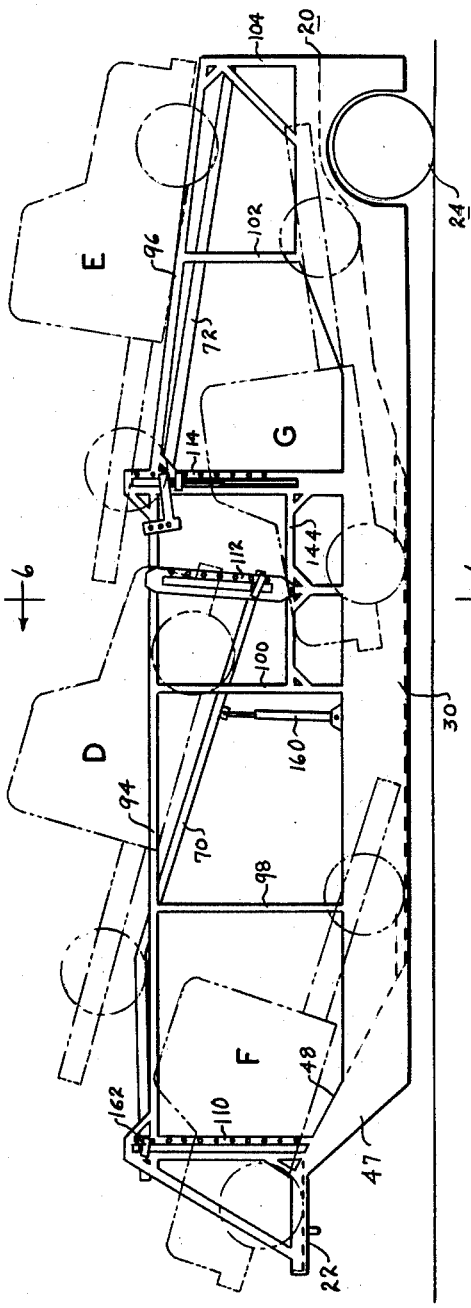
FIGURE 2 is another side elevational view of the present trailer showing it supporting a number of trucks in a different arrangement from that shown in FIGURE 1.
Figure 6:
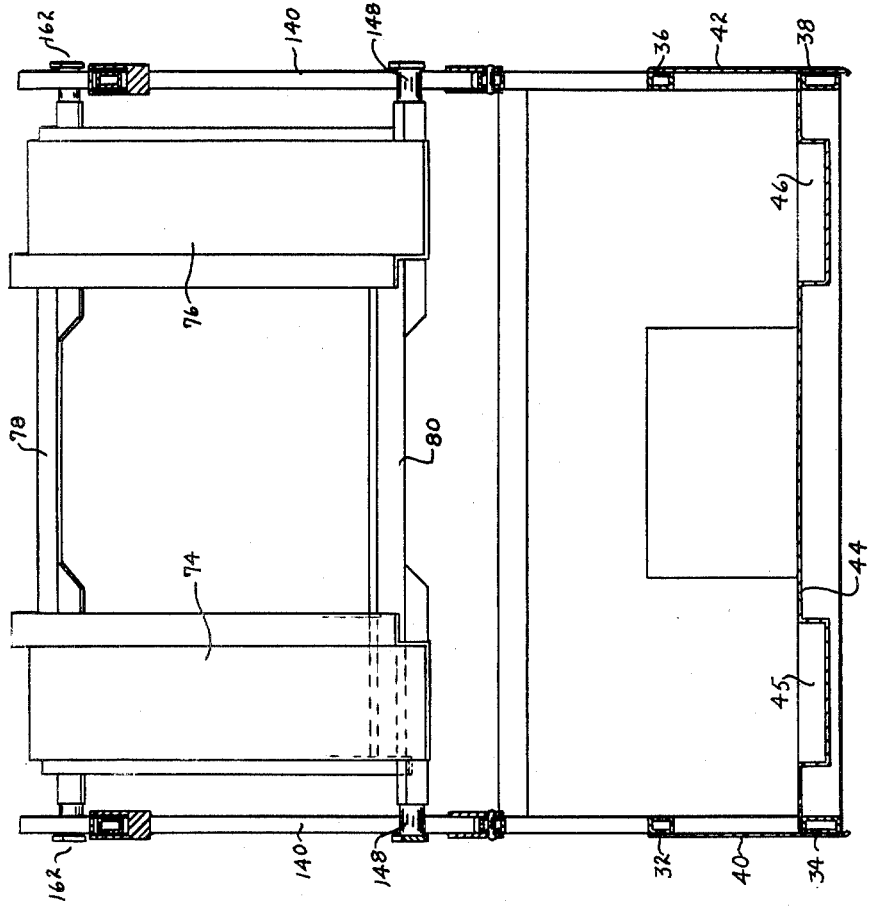
FIGURE 6 is a vertical cross sectional view of the trailer with the vehicles removed, taken on line 6—6 of FIGURE 2.

Referring more specifically to the drawings and to FIGURES 1 and 2 in particular, numeral 20 designates the present trailer and letters A, B and C, three conventional trucks mounted in one arrangement on the trailer, and letters D, E, F and G, trucks of substantially the same construction, though slightly smaller than the trucks shown in FIGURE 1, placed on trailer 20 in a different arrangement. A tractor (not shown) is connected to the hitch or fifth wheel portion 22 of the trailer, and for the purpose of the present invention, the tractor may be considered as conventional in construction and operation. The front end of the trailer is supported by the tractor, and the rear end by an undercarriage 24 consisting of either a single or tandem axle construction. The undercarriage, while forming an important part of the trailer construction, will not be described in detail herein, since any conventional undercarriage used on trailers may be incorporated in the present trailer construction. When the trailer is disconnected from the tractor, the front end is supported by parking wheels (not shown) adjacent the front end thereof.

The present trailer consists of a long low bed 30 formed by side members 32 and 34 on the left hand side of the trailer, and side members 36 and 38 on the right hand side, the two members on each side being enclosed on the external surface by steel panels 40 and 42, respectively. Panels 40 and 42 are welded or otherwise joined to the respective members to form a solid, smooth appearance externally. The bed thus formed supports floor 44, having vehicle wheel tracks 45 and 46 formed in the bottom thereof. The forward end of the bed is connected to the fifth wheel structure 22 by an upwardly inclined structure 47 having an inclined surface 48 on which the forward end of a vehicle may be rolled during the loading operation. In order to facilitate loading and to reduce the overall height of the loaded vehicle, pivoted tracks 50 and 52 are placed in bed 30 for providing a runway for the vehicles being loaded in the forward end of the bed. These two tracks are pivoted at numerals 54 and 56, respectively, and are raised and lowered by levers 58 and 60, respectively, by a hydraulic cylinder 62 through a linkage 64. Rotation of linkage 64 in the clockwise direction as viewed in FIGURE 8 raises tracks 50 and 52 to the position for loading the vehicles in the forward end of the bed. After the vehicles have been loaded on the bed, the hydraulic cylinder 62 rotates linkage 64 in the counter-clockwise direction, thus lowering the tracks to their lowest position illustrated by broken lines in FIGURE 8, thus permitting the vehicle supported by the tracks to be placed in its fully lowered position on the bed.

The upper tier of vehicles represented by letters A and B or D and E are supported by frames 70 and 72, the former consisting of longitudinally arranged spaced tracks 74 and 76, rigidly connected to one another by members 78 and 80, and the latter frame consisting of tracks 82 and 84, rigidly connected to one another by members 86 and 88. The two tracks of each frame 70 and 72 are preferably constructed of channel iron of sufficient strength and size to fully support a vehicle without any additional reinforcement or undersupporting structure. The two frames are supported by side structures 90 and 92, each consisting of horizontal side members 94 and 96 and vertical support members 98, 100, 102 and 104. The frame 70 is connected to and supported by the side structure by adjustment mechanism 110 at the forward end and 112 at the rear end thereof, and frame 72 is supported by adjustment structure 114 at the forward end, and a rigid support member 116 at the rear end. The rigid support member 116 is adjustable into three positions by fixtures 118, 120 and 122 on the left side of the vehicle as viewed in FIGURE 4, and fixtures designated by the same numerals with primes on the right side of the vehicle. These three fixtures are rigidly supported by vertical members 104 and 104'. Fixture 116 consists of a laterally extending arm 124 for receiving and supporting an arm 126 forming an extension on cross member 88 of rear frame 72, arm 124 being supported by a base member 128 in one of the three fixtures, for example, fixture 118. Arm 124 contains a recess 130, and arm 126 contains a projection 132 for forming an interlocking retaining means holding frame 72 in proper position after the trailer has been loaded with vehicles.

Figure 7:
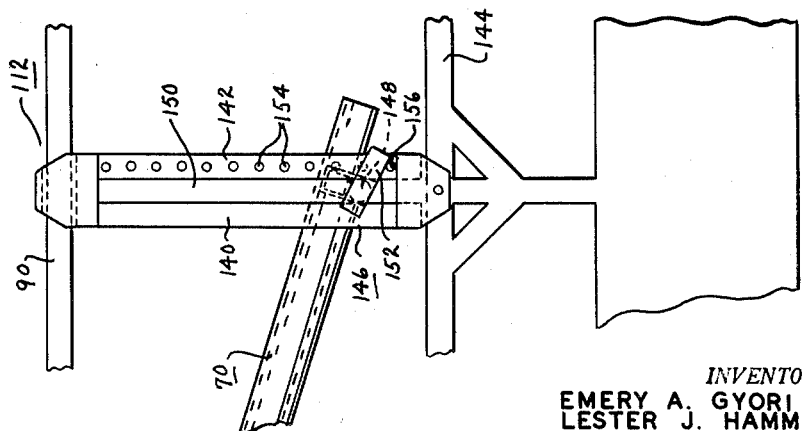
FIGURE 7 is a fragmentary side elevational view of a portion of the adjustment mechanism for the structure supporting the upper tier of the vehicles.

The adjustment mechanisms 110, 112 and 114 on the left hand side and the corresponding mechanisms on the right hand side of the trailer are essentially the same in construction and, as shown in FIGURE 7, consist of two vertical members 140 and 142, joined at the top to side member 90 and at the bottom to an auxiliary horizontal member 144 extending between vertical member 100 and adjustment mechanism 114. Mechanisms 112 and 112' are pivoted to horizontal member 144 to permit these mechanisms to move sufficiently to accommodate frame 70 in any of its various positions. A pivot member 146 consisting of a pin 148 is joined rigidly to cross member 80 and projects through the space 150 between vertical members 140 and 142 and is slidable vertically therein. Pin 148 is rigidly secured to cross member 80 and contains an arm 152, extending along the external surface of vertical member 142 in which a series of spaced holes 154 is provided for receiving a pin 156, movable from one hole to the other to obtain the desired heights of the respective end of frame 70. In order to facilitate making the adjustment in height, a hydraulic cylinder 160 is mounted at its lower end on frame member 32 and connected at its upper end to frame 70. As shown in FIGURES 1 and 2, the hydraulic cylinder is adapted to raise or lower frame 70 to the desired position. After the desired position has been obtained, pin 156 is placed in the nearest hole beneath arm 152 and thereafter supports the respective end of frame 70. A similar adjustment means is provided on adjustment mechanism 110, the adjustment means being indicated by numeral 162. It is thus seen that frame 70 can be lifted in a substantially horizontal plane from the lower portion of adjustment mechanisms 110 and 112 to the upper portion thereof, thus providing an ample space for loading and unloading vehicles on bed 30 without interference from the frame. After the loading has been completed, the frame is adjusted to one of the positions shown in FIGURES 1 or 2 or some intermediate position, usually with only a small amount of clearance between the frame and the top of the vehicle on the bed, as shown for vehicle C in FIGURE 1 and vehicle F in FIGURE 2. The adjustment mechanisms 110' and 112' are on the right hand side of the trailer and are the same in construction and operation as those on the left hand side.

The adjustment mechanisms 114 and 114' are substantially the same as mechanism 112 with the exception that an additional adjustment feature is included to assist in pivoting and latching frame 72, the construction of this feature being shown in detail in FIGURES 12 through 15. This latching mechanism consists of a pin 170, extending through vertical slot 172 between members 174 and 176, and containing an arm 178 rigidly connected to the outer end thereof. The inner end of pin 170 is rigidly connected to cross member 86 such that tilting of member 178 tilts frame 72 in various positions for loading and unloading the automobiles, as illustrated in FIGURE 8. After frame 72 has been tilted to the position shown in FIGURE 8, it is locked in its raised position by a pin 180 extending through one of the holes 182 in members 178 and 178', the pin passing immediately beneath horizontal side member 90 as shown in FIGURES 12 through 15. A hydraulic cylinder 183 raises and lowers frame 72 in adjustment mechanism 114, permitting the frame to be placed in the position shown in FIGURE 8, or in one of the positions shown in FIGURES 1 and 2. After an adjustment in height is made, a pin 184 is placed in the proper hole for the respective height, to hold the frame in the adjusted position during transportation of the loaded trailer.

In loading the present trailer, frames 70 and 72 are moved to their uppermost position with the ends of frame 70 held in the uppermost portion of adjustment mechanisms 110 and 112, and with the forward end of frame 72 held in the uppermost end of adjustment meachanism 114. With frame 72 in its uppermost position in adjustment mechanism 114, the frame is tilted and held in its raised position shown in FIGURE 8 by levers 178 and 178', and pin 180. The vehicles can now be readily loaded and unloaded from bed 30 without any interference from the structure supporting the upper tier of automobiles. After the trailer has been loaded in any suitable manner such as that shown in FIGURES 1 or 2, frames 70 and 72 are then lowered to a position in close proximity to the tops of the vehicles on the bed and locked in place by the use of the pins in the adjustment mechanisms 110, 112 and 114. Thereafter vehicles A and B, or D and E, are placed on the trailer, and the four vehicles tied or otherwise locked in position for transportation. After the vehicles have arrived at their destination, the reverse operation is performed to remove the vehicles from the trailer.

It is seen that the versatility of frames 70 and 72 in adjusting to the vehicles on the bed permits various sizes and shapes of vehicles to be carried on the trailer in the most economical manner, and the greatest number to be carried without any difficulty encountered in loading and unloading the vehicle. While only one embodiment of the present invention is described in detail herein, various changes and modifications of the present trailer may be made, and various combinations of features disclosed herein can be used without departing from the scope of the present invention.

We claim:

1. A trailer for hauling automobiles, trucks and similar vehicles of various sizes and shapes, comprising an elongated bed portion, a forward frame above the forward end of said bed portion having spaced parallel tracks for supporting a vehicle, a vertically adjustable pivot means supporting each end of said frame, a structure supporting said pivot means on said bed portion, the pivot means at the rear end of said frame being pivoted at its lower end to said structure, a rear frame above the rearward end of said bed portion having spaced parallel tracks for supporting a vehicle, a vertically adjustable pivot means supporting the forward end of said rear frame, a forwardly extending lever connected to said last mentioned pivot means for raising the rear end of said rear frame and holding said rear frame in said raised position, an adjustable means for releasably supporting the rear end of said rear frame, each of said adjustable pivot means for the respective frames including two spaced vertically positioned members defining a vertical slot, one of said members having a plurality of vertically spaced holes, a pivot pin joined to the respective end of the respective frame and extending through and movable in the slot, a pin seating in one of said vertically arranged holes for retaining said first mentioned pin in its adjusted position and the frame thereof in a preselected vertical position, hydraulic cylinders for raising and lowering one end of said forward frame, and hydraulic cylinders for raising and lowering the forward end of said rear frame.

2. A trailer for hauling automobiles, trucks and similar vehicles of various sizes and shapes, comprising an elongated bed portion, a forward frame above the forward end of said bed portion having spaced parallel tracks for supporting a vehicle, a vertically adjustable pivot means supporting each end of said frame, a structure supporting said pivot means on said bed portion, the pivot means at the rear end of said frame being pivoted at its lower end to said structure, a rear frame above the rearward end of said bed portion having spaced parallel tracks for supporting a vehicle, a vertically adjustable pivot means supporting the forward end of said rear frame, an adjustable means for releasably supporting the rear end of said rear frame, each of said adjustable pivot means for the respective frames including two spaced vertically positioned members defining a vertical slot, one of said members having a plurality of vertically spaced holes, a pivot pin joined to the respective end of the respective frame and extending through and movable in the slot, a pin seating in one of said vertically arranged holes for retaining said first mentioned pin in its adjusted position and the frame thereof in a preselected vertical position, a power operated means for raising and lowering one end of said forward frame, and a power operated means for raising and lowering the forward end of said rear frame.

3. A trailer for hauling automobiles, trucks and similar vehicles of various sizes and shapes, comprising an elongated bed portion, a forward frame above the forward end of said bed portion having spaced parallel tracks for supporting a vehicle, a vertically adjustable pivot means supporting each end of said frame, a structure supporting said pivot means on said bed portion, one of said pivot means being pivoted at its lower end to said structure, a rear frame above the rearward end of said bed portion having spaced parallel tracks for supporting a vehicle, a vertically adjustable pivot means supporting the forward end of said rear frame, a means for releasably supporting the rear end of said rear frame, each of said adjustable pivot means for the respective frames including two spaced vertically positioned members defining a vertical slot, one of said members having a plurality of vertically spaced holes, a pivot pin joined to the respective end of the respective frame and extending through and movable in the slot, a pin seating in one of said vertically arranged holes for retaining said first mentioned pin in its adjusted position and the frame thereof in a preselected vertical position, and a power operated means for raising and lowering said frames.

4. A trailer for hauling automobiles, trucks and similar vehicles of various sizes and shapes, comprising an elongated bed portion, a forward frame above the forward end of said bed portion having spaced parallel tracks for supporting a vehicle, a vertically adjustable pivot means supporting each end of said frame, a structure supporting said pivot means on said bed portion, one of said pivot means being pivoted at its lower end to said structure, a rear frame above the rearward end of said bed portion having spaced parallel tracks for supporting a vehicle, a vertically adjustable pivot means supporting the forward end of said rear frame, a means for releasably supporting the rear end of said rear frame, each of said adjustable pivot means for the respective frames including two spaced vertically positioned members defining a vertical slot, one of said members having a plurality of vertically spaced holes, a pivot pin joined to the respective end of the respective frame and extending through and movable in the slot, and a pin seating in one of said vertically arranged holes for retaining said first mentioned pin in its adjusted position and the frame thereof in a preselected vertical position.

5. A trailer for hauling automobiles, trucks and similar vehicles of various sizes and shapes, comprising an elongated bed portion, a forward frame above the forward end of said bed portion having spaced parallel tracks for supporting a vehicle, a vertically adjustable pivot means supporting each end of said frame, a structure supporting said pivot means on said bed portion, one of said pivot means being pivoted at its lower end to said structure, a rear frame above the rearward end of said bed portion having spaced parallel tracks for supporting a vehicle, a vertically adjustable pivot means supporting the forward end of said rear frame, a lever connected to said last mentioned pivot means for raising the rear end of said rear frame and holding said rear frame in said raised position, an adjustable means for releasably supporting the rear end of said rear frame, each of said adjustable pivot means for the respective frames including two spaced vertically positioned members defining a vertical slot, a pivot pin joined to the respective end of the respective frame and extending through and movable in the slot, and means for retaining said pin in its adjusted position in said slot.

References Cited in the file of this patent

UNITED STATES PATENTS

| | | |
|---|---|---|
| 1,894,534 | Dolan | Jan. 17, 1933 |
| 1,978,287 | Thomas | Oct. 23, 1934 |
| 2,694,597 | Kunz | Nov. 16, 1954 |
| 2,883,231 | Dawson | Apr. 21, 1959 |
| 2,993,725 | Van Keuren | July 25, 1961 |